United States Patent Office 3,161,463
Patented Dec. 15, 1964

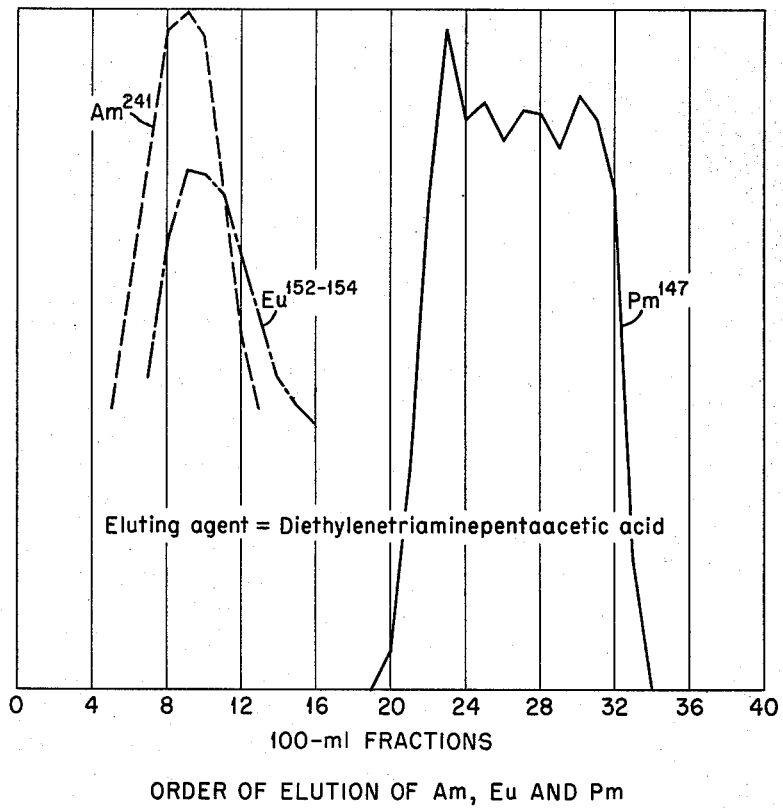
ORDER OF ELUTION OF Am, Eu AND Pm
INVENTOR.
Porter B. Orr, Jr.

3,161,463
METHOD FOR PURIFICATION OF PROMETHIUM-147
Porter B. Orr, Jr., Knoxville, Tenn., assignor to the United States of America as represented by the United States Atomic Energy Commission
Filed Jan. 29, 1963, Ser. No. 255,158
5 Claims. (Cl. 23—14.5)

My invention relates to methods of segregating rare earth values, and more particularly to methods of isolating promethium values from a mixture of rare earth and actinide values.

Promethium-147 is an important radioactive isotope because of its reasonably long half-life and the relative safety associated with its low energy beta emission. It has found use in X-ray sources and as an energy source for luminous dials. In these and in other uses promethium must be substantially free of other radioactive elements. Inasmuch as it originates as a uranium fission product it must be separated from other fission products and actinide elements. The use of ion exchange resins to separate rare earth and actinide values from each other is well-established, and is dependent upon selective chelating tendencies of an eluting agent. The separation of promethium from other rare earth values has been accomplished by sorbing these values on a cation exchange resin, then eluting with citric acid; however, even in several steps citric acid does not achieve a high degree of separation of promethium and americium. Typically the highest purity that has been obtained with citric acid as an eluant is about 65 percent promethium in three passes over a cation exchange resin.

It is accordingly one object of my invention to provide an improved method for separating promethium from americium and rare earth values.

I have discovered that an eluant comprising diethylenetriaminepentaacetic acid passed through a cation exchange resin bed having promethium and americium sorbed thereon substantially completely separates promethium from americium, and in accordance with my invention I have provided an improvement in an ion exchange method of separating promethium values from an acidic aqueous solution containing promethium and extraneous metal values selected from rare earth and actinide values comprising passing said solution through a cation exchange resin bed under conditions whereby said values are sorbed on said bed, eluting said values from said resin with an eluant having different chelating strengths for said values, said improvement comprising eluting said values from said resin with an aqueous solution of diethylenetriaminepentaacetic acid and separately collecting the portion of the eluate containing promethium values.

A typical feed material containing one percent promethium can be concentrated to 20-25 percent promethium in a single pass using diethylenetriaminepentaacetic acid as the eluant. A second pass will concentrate the promethium to over 99 percent.

The drawing is a graph showing the order of elution of americium, europium and promethium using diethylenetriaminepentaacetic acid as the eluting agent.

In carrying out my separation method promethium and the other metal values from which promethium is to be separated (typically americium, and other actinide and rare earth values) are sorbed onto a cation exchange resin bed by passing an aqueous acidic solution containing these values through said bed. This sorption step does not constitute a part of my invention and methods of carrying out the sorption step will be apparent to the ordinary worker in the art.

Any cation exchange resin capable of sorbing rare earth values may be used. Typically useful resins are the sulfonic acid resins having not less than 4 percent nor more than 8 percent cross-linkage.

The promethium and americium values, sorbed on the cation exchange resin bed, are separated from each other and from other metal values also present by passing an aqueous solution of diethylenetriaminepentaacetic acid through the bed and separately collecting the fractions containing individual metal values. The order of elution of the rare earths and americium using diethylenetriaminepentaacetic acid as the eluting agent is as follows: dysprosium, holmium, erbium, thulium, ytterbium, lutetium, terbium, europium-americium, gadolinium, samarium, yttrium, promethium, neodymium, praseodymium, cerium and lanthanum.

Europium and americium are eluted together, so if europium is present and separation of europium and americium is desired, the portion containing europium and americium can be sorbed onto a second cation exchange resin bed and eluted with citric acid. The order of elution of elements with citric acid is different than with diethylenetriaminepentaacetic acid (for instance citric acid elutes promethium and americium together) and separation of europium and americium can be achieved if desired.

The eluant must contain diethylenetriaminepentaacetic acid in a concentration of 0.1 to 1.5 percent and preferably in a concentration of 0.4 to 1.0 percent. The optimum concentration is about 0.5 percent. The pH of the solution must be in the range of 4 to 7.5, preferably about 5.

The temperature of the resin bed is not critical and may be suitably from 70 to 90° C. The rate of chelation reaction proceeds more rapidly as the temperature is raised, and the preferred temperature is about 80° C.

My method of separating americium and promethium may be used in combination with methods of separating other rare earths and actinides from each other, and is particularly well-suited for use with other ion-exchange separation steps. For instance, the prior art method of separating promethium and americium using citric acid as an eluant may be used in combination with my method and this combination of steps is a preferred method of carrying out my invention when europium is also present and separation of americium from europium as well as from promethium is desired. The following example, offered to illustrate my invention in detail shows this preferred two-step method.

EXAMPLE

A mixture of rare earths and actinides was dissolved in 16 molar nitric acid. The resulting solution, containing dissolved stable yttrium, stable lanthanum, Ce-144, stable cerium, Pr-144, Nd, Pm-147, Sm, stable Eu, Eu 152-154 and Am-241 was diluted with water to about 0.1 molar nitric acid and passed through a 4-foot-long 15-millimeter column filled with 60 mesh Dowex 50 W-4X cation exchange resin. The column was maintained at 75° C. The sorbed values were eluted by passing a 0.2 molar citric acid solution, adjusted to a pH of 3.0 with $NH_4OH$, through the column at a rate of one column-volume per hour. An electrometer was used to monitor activity peaks. When the column discharge showed the presence of Pm-147 the eluate was collected until the discharge activity dropped to about 25 millicuries per milliliter. This fraction, comprising about 25 percent Pm-147 was acidified with 1.5 milliliter of 16 normal $HNO_3$ per 100 milliliters of solution to break the citrate complex in order to permit adsorption of Pm-147 on a cation exchange resin. The resulting solution containing Pm-147, Am-241, and smaller amounts of Sm and Nd (possibly traces of Eu) was passed into a column identical to the first column. The column containing the sorbed metal values was then washed by passing water through the bed to remove excess acid from the system. A water solution of 0.5 percent diethylenetriaminepentaacetic acid having a pH of 5.0 was then passed through the system at a rate of one column-volume per hour. An electrometer was again used to record activities as they were eluted. The promethium was collected in two fractions—one being that fraction before and after the Pm-147 peak was reached as indicated by the electrometer, and the second being that fraction collected at the Pm-147 peak. Analyses of the two fractions are given in the following table.

Table

| Fraction No. | Content of Solution, percent | | | | | Percent of Original Amount of Pm |
|---|---|---|---|---|---|---|
| | Pm-147 | Sm | Nd | Eu | Am-241 | |
| 1 | 75 | 12 | 12 | Nil | Nil | 25.0 |
| 2 | 99 | 1 | 1 | Nil | Nil | 61.8 |

There are obvious modifications in the process described in this example which can be made by the ordinary worker in the art. For instance, variations in flow rates of eluant, capacity and size of the resin bed, and concentrations of the eluants may readily be made. Accordingly, my invention should be limited in scope only as set forth in the following claims.

Having thus described my invention, I claim:

1. In an ion exchange method for separating promethium values from an acidic aqueous solution containing promethium and extraneous metal values selected from rare earth and actinide values comprising passing said solution through a cation exchange resin bed under conditions whereby said values are sorbed on said bed and eluting said values with an eluant having different chelating strengths for said values, the improvement comprising eluting said values from said resin with an aqueous solution containing 0.1 to 1.5 percent diethylenetriaminepentaacetic acid and having a pH in the range of 4 to 7.5 and separately collecting the portion of the eluant containing promethium values.

2. The method of claim 1 wherein said acidic aqueous solution contains promethium and americium values.

3. The method of claim 1 wherein said eluant is maintained at a pH of about 5 and contains diethylenetriaminepentaacetic acid in a concentration from 0.4 to 1.0 percent.

4. An ion exchange method for separating promethium values from an aqueous acidic solution containing promethium, americium and rare earth values comprising:
   (a) passing said solution through a cation exchange resin bed under conditions whereby said values are sorbed on said bed;
   (b) passing an aqueous solution of citric acid through said bed under conditions whereby said values are eluted and separately collecting the fraction of the solution containing promethium;
   (c) adjusting the composition of the promethium-containing fraction to permit sorption of said promethium on a cation exchange resin;
   (d) passing the resulting adjusted solution through a cation exchange resin bed under conditions whereby promethium values are sorbed on said bed; and
   (e) passing an aqueous solution containing 0.1 to 1.5 percent diethylenetriaminepentaacetic acid and having a pH in the range of 4 to 7.5 through said bed under conditions whereby promethium values are eluted and separately collecting the fraction of the solution containing said promethium values.

5. The method of claim 4 wherein in step (e) said aqueous solution contains diethylenetriaminepentaacetic acid in a concentration of 0.4 to 1.0 percent and is at a pH of about 5.

References Cited by the Examiner

AEC Document, IS-329, May 1960, pp. 6, 7 and 14.

AEC Document, AEC-tr-4497, translated from a U.S.S.R. publication, 1958, pp. 369-375.

Journal of Inorganic and Nuclear Chemistry, September 1961, pp. 133-141.

CARL D. QUARFORTH, *Primary Examiner.*

REUBEN EPSTEIN, *Examiner.*